Feb. 14, 1967 C. W. HELM 3,304,554
MARKING DEVICE FOR SOUND TRANSLATING APPARATUS
Filed Feb. 8, 1965 3 Sheets-Sheet 1

INVENTOR
CHARLES W. HELM
BY Raymond W Colton
ATTORNEY

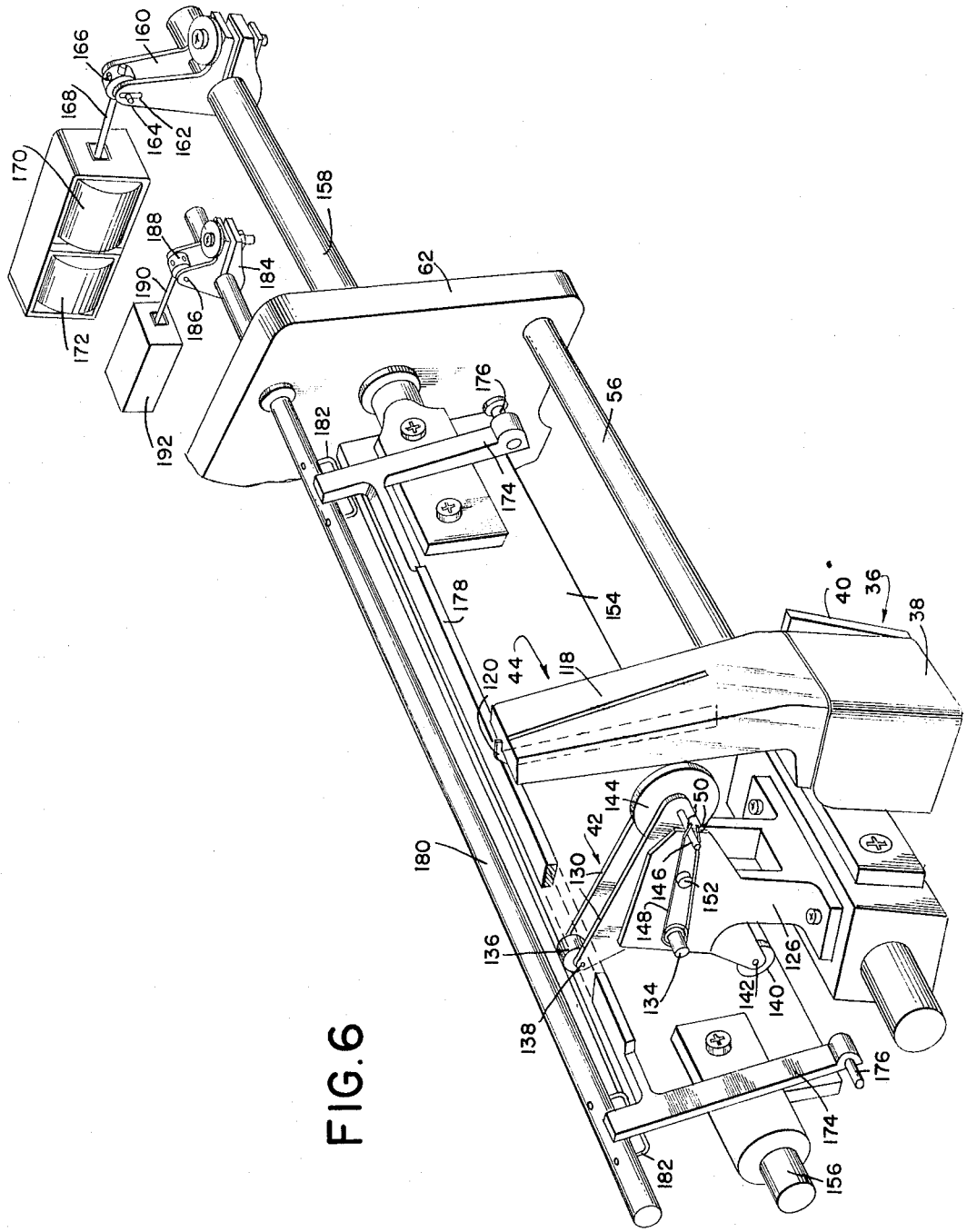

United States Patent Office 3,304,554
Patented Feb. 14, 1967

3,304,554
MARKING DEVICE FOR SOUND
TRANSLATING APPARATUS
Charles W. Helm, Rocky Hill, Conn., assignor to The Gray Manufacturing Company, a corporation of Connecticut
Filed Feb. 8, 1965, Ser. No. 430,956
17 Claims. (Cl. 346—62)

This invention relates to sound translating apparatus and is particularly concerned with the indexing aspects of such apparatus.

It is quite important that adequate indexing be provided in conjunction with sound translating equipment to render it possible to locate rapidly any desired portion of a recording on a medium with which the index element is associated. In the course of dictation, it is important for the transscription that the typist knows approximately the length of the dictation to be transcribed, the portions to which special attention is required, as in the case of corrections to be made, and the total amount of recording that has been imposed upon the record medium. Whereas some of these functions are important in conjunction with embossed recording, they are all extremely important in conjunction with magnetic recording where there is no visual indication on the record medium as to any recording on the medium or to the extent of use of the medium.

Various arrangements of marking or punching have been suggested in the past to achieve the indexing functions desired in conjunction with such equipment, and it has been almost universal among such arrangements, particularly where remote actuation is involved, that they have been rather complicated and correspondingly expensive to build and maintain.

It is among the objects of the present invention to provide all of the desired and necessary indexing functions in conjunction with remote actuation in a relatively simple and inexpensive fashion, particularly in connection with magnetic media of the belt type. Sound translating apparatus conforming to the present invention comprises relatively movable frame and carriage members, a support mounted on one of the members to receive a pressure sensitive index element, indicating and marking means disposed on opposite sides respectively of the support, means for advancing the marking means towards the support to apply pressure to an adjacent surface of an index element carried by the support and producing a mark on the remote surface of the element, and means mounted on one of the members for energizing the advancing means. It is contemplated that the one member be the frame member and that the other member be the carriage member. It is also contemplated that the marking means be supported by pivot means and that the marking means be pivotally and slidably mounted on the carriage member. A plurality of marking elements movable towards and from the support are preferred and the indicating and marking means may be mounted on the same member. It is also contemplated that the indicating and marking means be mounted on different ones of the members. The advancing means preferably includes a plurality of members for imparting different paths of motion to the marking means to produce different markings respectively on the index element.

It is also contemplated that the sound translating apparatus in accordance with the present invention comprise relatively movable frame and carriage members, a support mounted on the frame member and spaced forwardly thereof to receive a pressure sensitive index element, a marking device mounted on the carriage member between the carriage member and support the marking device being moveable with the carriage and relative thereto, an indicating device mounted on the carriage member beyond the support, an actuator carried by the frame member for advancing the marking device relative to the carriage member towards the support to apply pressure to an adjacent surface of an index element carried by the support and producing a mark on a remote surface of the element, and electromagnetic means for energizing the actuator. A second marking device is preferably movably mounted on the frame member and a second actuator is preferably carried by the frame member for advancing the second marking device towards an adjacent surface of an index element carried by the support to produce a mark on a remote surface of the element, the second marking device being substantially coextensive with the support. The marking device is preferably pivotally and slidably mounted on the carriage for movement relative to the carriage in dissimilar paths to produce dissimilar marks on the index element. A follower assembly preferably supports the marking device relative to the carriage and the actuator is preferably pivotally mounted on the frame member for movement in two directions to impart dissimilar movements to the marking device. The electromagnetic means includes two solenoids equipped with a single plunger mechanically coupled to the actuator. Energization of one winding attracts the plunger in one direction. Energization of the other winding attracts the plunger in the opposite direction. It is preferred that means be mounted on the carriage member for biasing the marking device towards an inactive position and that means be mounted on the frame member biasing the actuator towards an inactive position.

A more complete understanding of the invention will follow from a description of the accompanying drawings wherein:

FIG. 6 is a somewhat schematic perspective view from which the operation of the indexing and timing mechanisms can be best explained.

Figure 1:
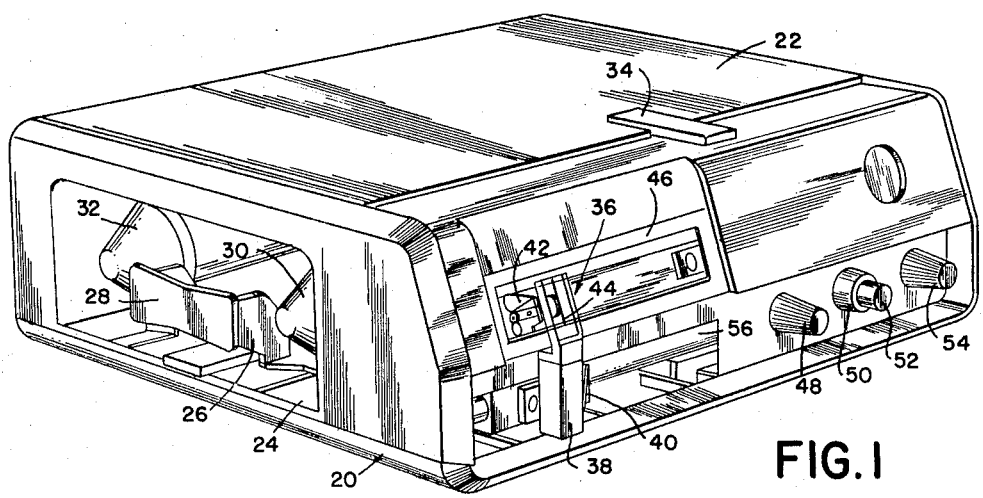
FIG. 1 is a perspective view of sound translating apparatus incorporating the present invention.

The sound translating apparatus depicted in the drawings employs a medium in belt form. Mounted on the base plate or frame 20 there is a mousing or cover member 22 containing an opening 24 in its left end as viewed in FIG. 1 from which a belt loading tray 26 can be retracted by means of its handle 28 to receive a belt type record medium, whereupon the tray 26 will be moved inwardly during which the medium will be applied to the forward mandrel 30 and the rear mandrel 32. Before retracting the tray 26, a lever 34 exposed through the upper portion of the cover 22 will be rocked about its pivot to reduce the distance between the mandrels 30 and 32 to facilitate application and removal of belt media with respect to the mandrels, and this same pivotal movement of the lever 34 serves to retract the transducer head with respect to the path of the belt media during application and removal of such media with respect to the mandrels. Conversely, after the medium has been applied to the mandrels and the tray 26 has been moved to its innermost position as depicted in FIG. 1, the lever 34 will be rocked to its position depicted in FIG. 1 to separate the mandrels 30 and 32 sufficiently to produce proper tension in the belt medium and at the same time, the transducer head will be moved towards the path of the medium to its proper transducing position.

The transducing head, not shown in FIG. 1, is supported on a carriage 36, a portion of which extends forwardly from the front panel of the machine. The carriage is provided with a handle 38 which can be manually operated to shift the carriage by depressing a pivoted actuator 40. The carriage supports a marking assembly 42 and an indicating assembly 44 on opposite sides of a support 46 adapted to receive an index strip, not shown, which can be marked and interpreted in accordance with the actual intelligence carried by the record medium.

Accessible on the front panel are a tuning knob 48 for precise positioning of the transducer in relation with a record track on the medium, a playback tone control knob 50 with a volume control knob 52, a multiposition selector knob 54 for any of a plurality of input signals, mainly voice signals appearing either at different levels or from different transducers permanently connected to the recorder.

Figure 2:
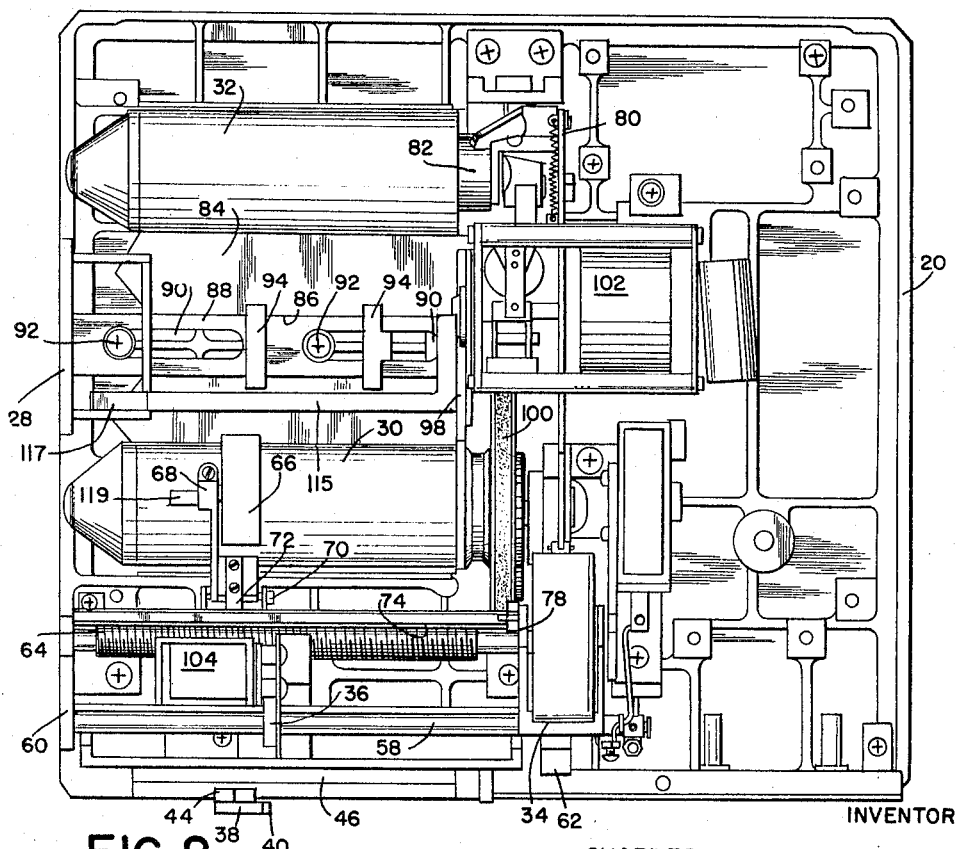
FIG. 2 is a plan view of sound translating apparatus like that shown in FIG. 1 with the cover removed and with certain other components removed for purposes of clarity.

The carriage 36 is suported on a lower guide rod 56, shown in FIG. 1 and an upper guide rod 58 shown in FIG. 2. These guide rods are supported in a pedestal 60 at the left end of the machine as shown in FIG. 2 and an intermediate pedestal 62 secured to the frame 20. Journalled in these pedestals is a lead screw 64 employed to impart both feeding and backspacing movements to the carriage 36, so as to cause the transducer 66 to move in a direction axially of the mandrels and of the belt medium when supported on the mandrels. The transducer 66 is carried by an arm 68 capable of rocking movement about a pivot 70 by which the transducer assembly is supported on the carriage. A follower 72 secured to the arm 68 projects beneath an elongated cam 74 which is substantially coextensive with the mandrel 30 and which is actuated by the lever 34 which carries a pin 76 received in a slotted arm 78 secured to the right end of the elongated cam 74 as viewed in FIG. 2.

The lever 34 is connected by means of a link 80 with a support 82 for the rear drum 32 so as to rock the support 82 about a pivot carried by the frame 20 whereby the spacing between the mandrels 30 and 32 will be varied to permit application and removal of the sleeve media.

The tray 26 has a bottom wall 84 containing a slot 86 receiving a guide 88 containing slots 90 which receive screws 92 on which the guide or rail 80 can slide. When the tray 26 is retracted, movement will be imparted to the tray itself as well as to the guide 88 to assure adequate support of the tray over a substantial portion of its length even when it is fully retracted. Intermediate bridges 94 are provided on the tray to suitably reinforce it. The tray provides an outboard abutment 96 and an inboard abutment 98 for properly locating a belt medium by engaging its ends.

The forward mandrel 30 carries an enlarged friction disc 100, in driving engagement with a suitable reducing train driven by a motor 102. The rear mandrel 32 is an idler and is rotated by its frictional engagement with a sleeve medium applied thereto. The motor 102 also, through suitable gearing, drives the lead screw 64.

The shaft of the drive mandrel 30 carries a gear 104 in mesh with the teeth of a gear 106 on the same shaft with a gear 108 which drives a gear 110 secured to the lead screw 64. A half-nut or threaded element 112 is carried by a yoke 114 on the carriage 36 for normal engagement with the lead screw during recording and reproducing operations. The yoke 114 is pivotally supported on a pin 116 received in the carriage.

Figure 3:
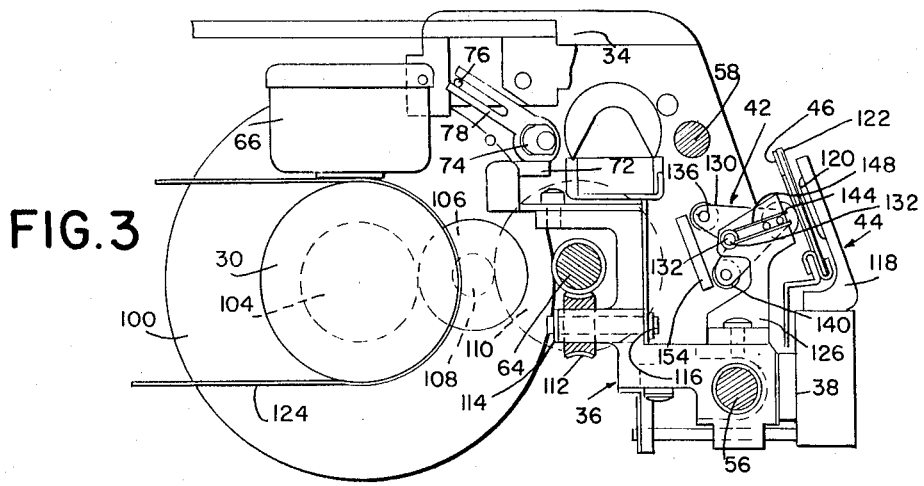
FIG. 3 is a fragmentary elevation partially in section of a portion of the indexing mechanism of the present invention.

The indicating assembly 44 mounted on the carriage 36 includes a transparent member 118 composed of plexiglass or the like and a metallic strip 120 to serve as an anvil secured to the rear surface of the transparent member 118 for engagement under the control of an operator with the forward surface of an index strip 122 adapted to be received in the support 46. The element 120 serves as a datum line and also serves to produce a mark on the forward surface of a pressure sensitive index strip 122 of the type contemplated, so as to produce a visible mark that will be indicative of the nature of intelligence recorded on the belt medium 124 schematically depicted in FIG. 3.

Figure 5:
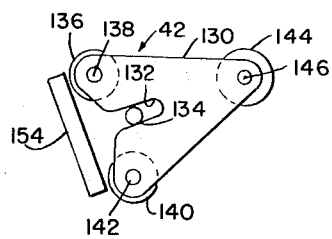
FIG. 5 is an elevation, on a somewhat enlarged scale, of a portion of the mechanism depicted in FIG. 3.

A bracket 126 on the carriage 36 provides a pin 134 on which a pair of substantially triangular plates 130 are mounted for pivotal as well as rectilinear movement relative to the bracket. As best illustrated in FIG. 5, where the plates 130 have been removed from the bracket, each of the plates contains a slot 132 for reception of the pin 134. At the upper left-hand corner of the plates 130 as viewed in FIG. 5, there is a roller 136 mounted on a pivot pin 138, and at the lower left-hand corner there is a similar roller 140 mounted on a pivot pin 142. At the forward corner, shown at the right in FIG. 5, there is a marking wheel 144 mounted on a pivot or spindle 146. The assembly shown in FIG. 5 is biased towards the position shown relative to the bracket 126 by means of a pair of hairpin springs 148 whose closed ends are received on the pin 134 and whose open ends engage diametrically opposed portions of the pin or spindle 146. It will be noted that the open ends 150 of each hairpin spring 148 are bent towards one another so as to bias the marking assembly towards the position depicted in the drawings. Stop pins 152 extend outwardly from the bracket 126 so as to bias the marking assembly in a pivotal fashion towards the neutral position depicted in the drawings.

Figure 4:
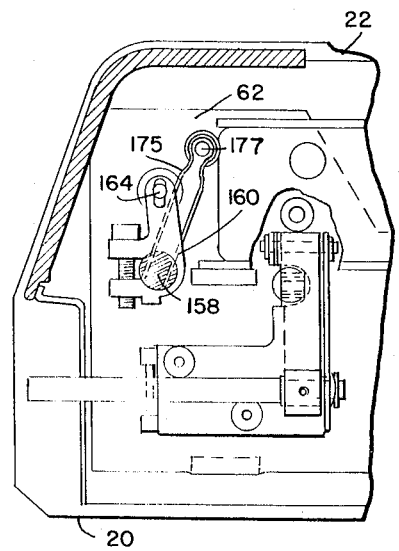
FIG. 4 is a fragmentary elevation, partially in section depicting another portion of the indexing mechanism.

The marking assembly is shifted relative to the bracket 126 by means of a plate 154 carried by a shaft 156 journalled in the pedestal 60 and by a shaft 158 journalled in the pedestal 62. By inspection of FIG. 6, it will be evident that when the plate 154 is rotated in a clockwise direction, it will engage the upper roller 136 causing the marking wheel 144 to move forwardly and downwardly so as to press a lower portion of the index element 122 into contact with the member 120 so as to produce a mark on the front surface of the pressure sensitive index strip. Similarly, when the plate 154 is rocked in a counterclockwise direction, it will engage the lower roller 140 causing the marking wheel 144 to move forwardly and upwardly so as to press an upper portion of the index strip 122 into engagement with the member 120 to produce a mark on the pressure sensitive index strip. A crank or arm 160 is secured to the shaft 158, the upper end of the arm containing slots 162 for the reception of a pin 164 carrying a collar 166 to which a rod 168 is secured. The rod 168 is connected to a plunger under the influence of each of the two solenoids 170 and 172. The electromagnet 170 will be energized to produce a clockwise movement of the plate 154 by expelling the rod 168 to produce a mark on the index element 122 that will indicate the need for special attention of the type required where a correction is to be made. Energization of the electromagnet 172 will retract the rod 168 to produce a counterclockwise movement of the plate 154 so as to move the marking wheel 144 upwardly and forwardly to produce a mark that will indicate the end of a message. The initial movement imparted to the marking wheel 144 by the plate 154 will be pivotal, and as the movement continues, forward movement will also be imparted so as to maintain contact between the marking wheel and the index element throughout the stroke intended for the marking operation. As previously indicated, after a marking operation, the marking wheel 144 will be restored to its initial position by means of the hairpin springs 148. Upon deenergization of either of the electromagnets which has been energized to produce a mark, the plate 154 will also be restored to its initial position by means of a hairpin spring 175 having a closed end received on a pin 177, shown in FIG. 4 and its open ends received in contact with flat portions formed on diametrically opposed parts of the shaft 158. These flat portions on the shaft 158 are parallel with the forward surface of the plate 154.

A pair of arms 174 are supported in the pedestals 60 and 62 by means of shafts 176, and carry near their upper ends a bar 178 which can be rocked forwardly for direct engagement with the rear surface of an index element or strip 122 so as to press it against the member 120 to produce a mark visible from the forward surface of the pressure sensitive index element. Inasmuch as the bar 178 is substantially coextensive with the support 46, it will follow that a mark will be produced on the index element whenever the bar assumes its position proximate to the index element. Rocking movement of the arms 174 and their bar 178 is imparted by rotation of a shaft 180 having lugs 182 projecting radially for engagement with the arms 174. The shaft 180 is journalled in the pedestals 60 and 62 and at its right end as viewed in FIG. 6, receives a crank or arm 184 provided with a pin 186 on which a collar 188 is supported to receive a rod 190 connected with an armature of a solenoid 192. The solenoid 192 will be actuated whenever a recording operation is in progress by means of electrical connections, not shown, so that whenever a message is being applied to the record medium, the bar 178 will press the index element 122 against the member 120 so that a line will appear on the forward surface of the index element. In this way, the operator can tell at a glance the length of the message that has been recorded on the medium. Inasmuch as the bar 178 which serves as the time marker will not be actuated during playback operation, the dictator can always observe just where to resume recording without producing unnecessary gaps in the recording medium and without recording over a previous message. Moreover, the operator will not be required to listen to a previously recorded portion of the dictation in order to know where the end of the previous recording is located.

Whereas only one form of the present invention has been described with respect to the accompanying drawings, a number of variations will suggest themselves to those skilled in the art and such variations are contemplated as coming within the scope of the appended claims.

I claim:
1. Sound translating apparatus comprising relatively movable frame and carriage members, a support mounted on one of said members to receive a pressure sensitive index element, anvil and marking means disposed on opposite sides respectively of said support, said anvil means including an anvil having a width of the order of a fine line, said anvil extending outwardly beyond said members and support and constantly exposed to the view of an observer, means for advancing said marking means towards said support to apply pressure to an adjacent surface of an index element carried by said support against said anvil and produce a mark of the order of width of said anvil on a remote surface of said element, and means mounted on said one member for energizing said advancing means whereby a mark so produced on said element is obscured from an observer only while in registry with said anvil.

2. Sound translating apparatus according to claim 1 wherein said one member is the frame member.

3. Sound translating apparatus according to claim 1 wherein the other of said members is the carriage member.

4. Sound translating apparatus according to claim 1 wherein pivot means support said marking means.

5. Sound translating apparatus according to claim 1 wherein said marking means is pivotally and slidably mounted on said carriage member.

6. Sound translating apparatus according to claim 1 wherein said marking means includes a plurality of marking elements movable towards and from said support.

7. Sound translating apparatus according to claim 1 wherein said anvil and marking means are mounted on the same one of said members.

8. Sound translating apparatus according to claim 1 wherein said advancing means includes a plurality of members for imparting different paths of motion to said marking means to produce different markings respectively on said index element.

9. Sound translating apparatus comprising relatively movable frame and carriage members, a support mounted on said frame member and spaced forwardly thereof to receive a pressure sensitive index element, a marking device mounted on said carriage member between said carriage member and support, said marking device being movable with said carriage and relative thereto, an anvil mounted on said carriage member beyond said support, an actuator carried by said frame member for advancing said marking device relative to said carriage member towards said support to apply pressure to an adjacent surface of an index element carried by said support against said anvil and produce a mark on a remote surface of said element, and electromagnetic means for energizing said actuator.

10. Sound translating apparatus comprising relatively movable frame and carriage members, a support mounted on said frame member and spaced forwardly thereof to receive a pressure sensitive index element, a marking device mounted on said carriage member between said carriage member and support, said marking device being movable with said carriage and relative thereto, an indicating device mounted on said carriage member beyond said support, an actuator carried by said frame member for advancing said marking device relative to said carriage member towards said support to apply pressure to an adjacent surface of an index element carried by said support and produce a mark on a remote surface of said element, electromagnetic means for energizing said actuator, a second marking device movably mounted on said frame member, and a second actuator carried by said frame member for advancing said second marking device towards an adjacent surface of an index element carried by said support to produce a mark on a remote surface of said element.

11. Sound translating apparatus according to claim 10 wherein said second marking device is substantially coextensive with said support.

12. Sound translating apparatus according to claim 9 wherein said marking device is pivotally and slidably mounted on said carriage for movement relative to said carriage in dissimilar paths to produce dissimilar marks on said index element.

13. Sound translating apparatus according to claim 9 wherein a follower assembly supports said marking device relative to said carriage, and said actuator is pivotally mounted on said frame member for movement in two directions to impart dissimilar movements to said marking device.

14. Sound translating apparatus according to claim 9 wherein said electromagnetic means includes armature means coupled to said actuator.

15. Sound translating apparatus according to claim 9 wherein said electromagnetic means includes armature means coupled to said actuator, and a plurality of selectively energizable windings operatively related to said armature means.

16. Sound translating apparatus according to claim 9 including means mounted on said carriage member biasing said marking device towards an inactive position.

17. Sound translating apparatus according to claim 9 including means mounted on said frame member biasing said actuator towards an inactive position.

References Cited by the Examiner

UNITED STATES PATENTS

| | | | |
|---|---|---|---|
| 2,055,141 | 9/1936 | Beard | 346—111 |
| 2,154,029 | 4/1939 | Brown | 346—111 |
| 2,820,639 | 1/1958 | Gillette | 274—1 |
| 2,865,637 | 12/1958 | Roberts | 274—4 |
| 2,940,761 | 6/1960 | La Forest | 274—1 |
| 3,203,000 | 8/1965 | Dollenmayer | 346—141 X |

RICHARD B. WILKINSON, *Primary Examiner.*

J. W. HARTARY, *Assistant Examiner.*